United States Patent [19]

Meier et al.

[11] Patent Number: 5,058,852
[45] Date of Patent: Oct. 22, 1991

[54] VEHICLE SEAT WHICH IS ADJUSTABLE IN HEIGHT AND WITH AUTOMATIC WEIGHT ADJUSTMENT

[75] Inventors: Johann Meier, Fensterbach/Wolfring; Johann Grassl, Pittersberg; Josef Dotzler, Amberg, all of Fed. Rep. of Germany

[73] Assignee: Grammer AG, Amberg, Fed. Rep. of Germany

[21] Appl. No.: 596,362

[22] Filed: Oct. 12, 1990

[30] Foreign Application Priority Data

Aug. 9, 1990 [DE] Fed. Rep. of Germany ....... 4025183

[51] Int. Cl.$^5$ ............................................. F16M 13/00
[52] U.S. Cl. .................. 248/588; 267/64.19; 248/406.2; 248/421; 248/631
[58] Field of Search ...................... 248/588, 631, 406.2, 248/161, 157, 421, 550; 297/345; 267/64.16, 64.27, 64.19

[56] References Cited

U.S. PATENT DOCUMENTS

| | | | |
|---|---|---|---|
| 4,213,594 | 7/1980 | Pietsch et al. | 248/631 X |
| 4,382,573 | 5/1983 | Aondetto | 248/588 X |
| 4,461,444 | 7/1984 | Grassl et al. | 248/631 X |
| 4,573,657 | 3/1986 | Sakamoto | 248/588 X |
| 4,638,982 | 1/1987 | Misher et al. | 248/550 X |
| 4,645,169 | 2/1987 | Mischer | 248/631 X |
| 4,659,052 | 4/1987 | Nagata | 248/588 X |
| 4,684,100 | 8/1987 | Grassl | 248/588 X |
| 4,729,539 | 3/1988 | Nagata | 248/588 X |
| 4,733,847 | 3/1988 | Grassl | 248/550 |
| 4,941,641 | 7/1990 | Granzow et al. | 248/588 |

*Primary Examiner*—Ramon O. Ramirez
*Attorney, Agent, or Firm*—Elliot M. Olstein; Raymond J. Lillie

[57] ABSTRACT

A vehicle seat which is adjustable in height and which affords automatic adjustment to the seat occupant weight comprises a gas spring between a seat frame and a base frame, a valve arrangement actuable by an actuating element to adjust the pressure in the gas spring in dependence on the weight of the seat occupant, and a means for setting the desired seat height. Disposed between the seat and base frames is a belt reel device with a coupling means, which like the gas spring, can be subjected to the action of pressure gas from a pressure source. The pressure source comprises a compressor driven by a drive motor, which are disposed on the vehicle seat. The valve arrangement includes a 2/2-way valve which serves only for the release of pressure gas from the gas spring, and a 3/2-way valve between the pressure source and the coupling means of the belt reel device. The valve arrangement may be mechanical/pneumatic in operation or may be controlled by an electronic control arrangement.

5 Claims, 7 Drawing Sheets

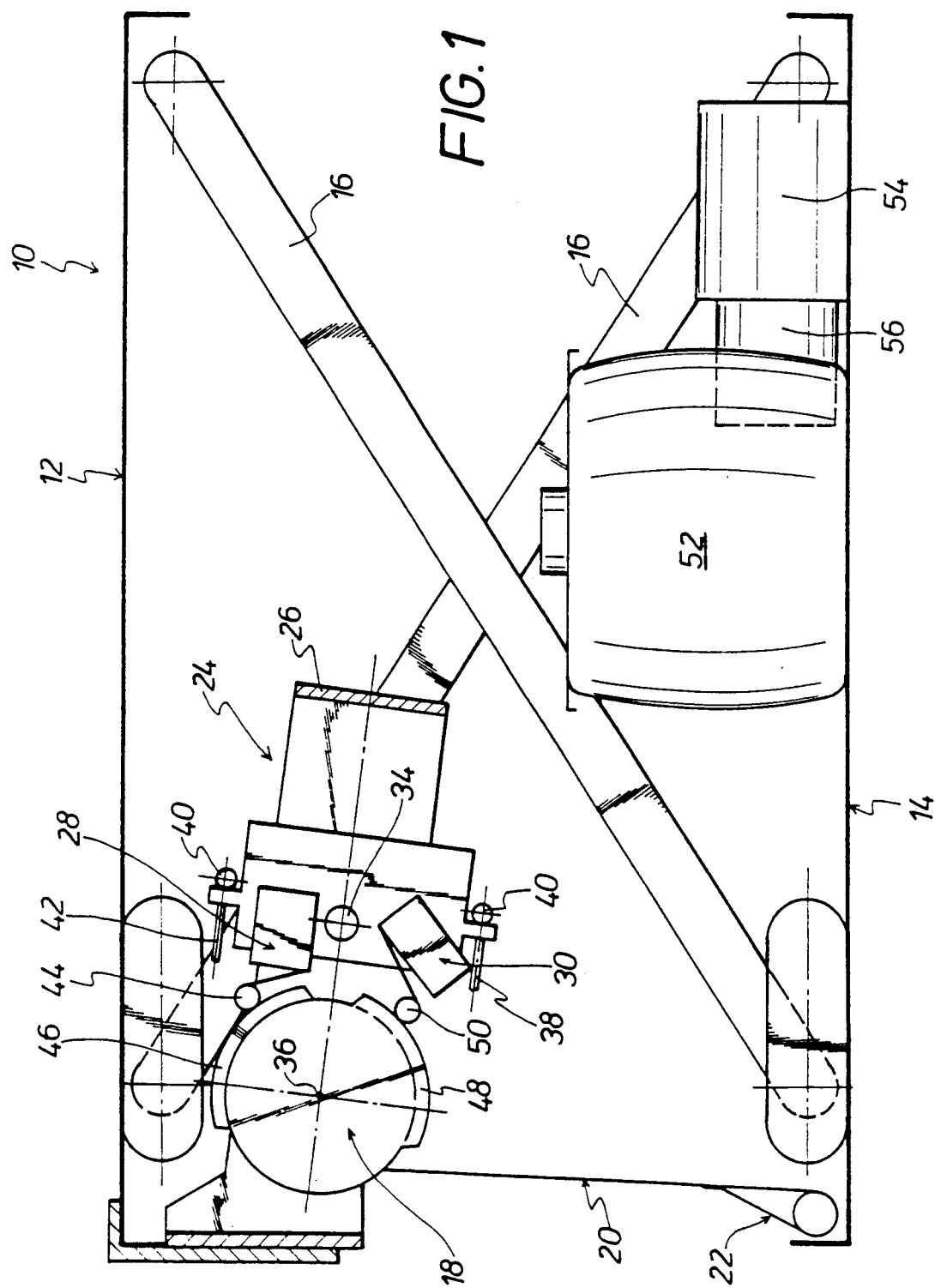

VEHICLE SEAT WHICH IS ADJUSTABLE IN HEIGHT AND WITH AUTOMATIC WEIGHT ADJUSTMENT

BACKGROUND OF THE INVENTION

With an aim to providing for an enhanced degree of comfort on the part of the occupant of a vehicle seat and to increase the adjustment capability thereof, one form of vehicle seat which comprises a base frame adapted to be secured to the floor of a vehicle, and a seat frame which is movable in relation thereto, comprises a gas spring disposed between the seat frame and the base frame, together with a valve arrangement which can be actuated by a suitable actuating element for adjusting the pressure in the gas spring in dependence on the weight of the occupant of the seat, thus providing a weight setting function, together with a means for adjusting the seat frame to the desired seat height, thus providing a height setting function. Disposed between the seat frame and the base frame is a belt take-up or reel device with a coupling means which, like the gas spring, can be subjected to the action of a pressure gas by means of a pressure source. A vehicle seat design of that kind is to be found in DE 35 17 505 C2 which sets out detailed information regarding the belt reel device and the coupling means provided therein, so that reference may be made thereto for a detailed description of the construction involved. It will only be noted at this point, for present purposes, that, upon each actuation of the actuating element for adjusting the height of the vehicle seat, the coupling means is subjected to the action of pressure gas from the pressure source in such a way that the connection between the belt reel device and the valve arrangement is interrupted. When the actuating element is not actuated, the belt reel device is mechanically connected to the valve arrangement by the coupling means so that any height adjusting movement of the vehicle seat, corresponding to a given seat occupant weight, is transmitted to the valve arrangement by way of the belt reel device and the coupling means thereof, and suitable setting of the valve arrangement provides that the gas spring is supplied with pressure gas from the pressure source or the gas spring is appropriately vented, in a manner corresponding to the weight of the seat occupant. The above-mentioned publication does not provide detailed information about the pressure source while in regard to the valve arrangement, the described configuration comprises, parallel to the belt reel device, a cam shaft with cams and cam followers or valve levers.

SUMMARY OF THE INVENTION

An object of the present invention is to provide an adjustable vehicle seat which is independent of an external pressure source and which is robust, reliable and precise in terms of adjustment operation, while being of a comparatively simple structure.

Another object of the present invention is to provide an adjustable vehicle seat which can be readily fitted to any suitable vehicle without involving major connections to components of the vehicle outside the seat.

Still another object of the present invention is to provide a vehicle seat which affords versatility of adjustment with simplicity of actuation.

In accordance with the present invention these and other objects are achieved by a seat for a vehicle including a seat frame, a base frame, a gas spring operatively disposed between the seat frame and the base frame, a valve means for adjusting the pressure in the gas spring in dependence on the weight of the seat occupant, when actuated by an actuating member, and a means for adjusting a desired seat height. Disposed between the seat frame and the base frame is a belt reel means with a coupling means which, like the gas spring, is adapted to be subjected to the action of a pressure gas from a pressure source for supplying the pressure gas to the gas spring and the coupling means. The pressure source comprises a compressor and a drive motor for driving same, with both the compressor and the drive motor being disposed on the vehicle seat. The valve means comprises a 2/2-way valve which serves only for blow-off of gas from the gas spring and a 3/2-way valve disposed between the pressure source and the coupling means of the belt reel means.

The fact that the pressure source comprising preferably an electric drive motor and a compressor driven thereby is disposed on the vehicle seat means that the vehicle seat is an autonomous assembly which can thus be installed in any vehicle. There is therefore no need for the vehicle to which the seat is to be fitted to have its own pressure source. That in turn means however that the seat according to the invention can be put to use in an unrestricted fashion, and that versatility is an aspect of great attraction from marketing points of view. A further advantage is that the valve means only comprises a 2/2-way valve and a 3/2-way valve, thus affording a simple design configuration which is reliable in operation.

The 2/2-way valve and the 3/2-way valve may be in the form of electromagnetically operated or solenoid valves which are connected to associated outputs of an electronic control circuit; the control circuit has inputs for a level switch and an up/down adjustment switch and a seat contact switch, as well as an output for connection of the drive motor for the compressor.

In another preferred feature of the invention the electronic control circuit may comprise a microprocessor, while an input circuit means may be disposed between the microprocessor and the inputs and suitable final or output stages may be provided between the microprocessor and the outputs. That arrangement provides an electronically controlled vehicle seat, with the control system being intended to ensure that the vehicle seat, with its gas springing action afforded by the gas spring, with integrated compressor, is automatically statically set to the respective weight of an occupant of the seat. In that connection activation of the vehicle seat for immediate weight adjustment is automatically effected by means of the seat contact switch. After each weight adjustment operation has been performed, the seat or the coupling means of the belt reel device is set into a passive operating condition in which no variations in the position in respect of height of the seat are registered. The control circuit is advantageously so designed that the vehicle seat always moves towards the static central position in an upward direction. It has been found that the static central position can be arrived at with a greater degree of accuracy and thus suitably set by virtue of the above-discussed procedure, that is to say by virtue of the seat moving to that position in an upward direction.

Re-activation of the control circuit occurs at each adjustment in respect of height of the seat because in that situation the coupling means of the belt reel device is activated, as indicated above. On the other hand reactivation of the control circuit also occurs when it is found that the seat is in the wrong position in respect of height, by virtue of the up/down adjustment switch being briefly actuated. The vehicle seat according to the invention is so designed in that respect that no adjustments can be made with the seat in an unloaded condition. The seat without a loading thereon does not automatically move back of its own accord into the static central position.

In the case of the above-discussed, electronically controlled seat, the seat contact switch therefore serves to detect that an occupant such as the driver of the vehicle has taken up a position on the seat. The level switch is provided to detect any position in respect of height of the seat, more specifically the seat frame, in relation to the base frame, above or below the static central position. The up/down adjustment switch serves for adjusting the height of the seat, that is to say to adjust the height of the seat frame above the base frame. The electronic control circuit is so designed that the inputs for the seat contact switch, the level switch and the up/down adjustment switch are protected from positive and negative voltage peaks. Furthermore the output for connection of the drive motor for the compressor is protected from overloading. If the corresponding compressor output stage becomes for any reason excessively hot, for example hotter than 95° C., the compressor drive motor is switched off, in which case the electromagnetically operated valves can continue to be actuated. It is only when the temperature of the compressor output stage falls below 95° C., again that the output for connection of the drive motor for compressor is activated again so that the compressor can be brought back into operation. The electronic control circuit is also so designed that it is de-activated for example for about one minute, in the event of a short-circuit. In addition the electronic control circuit is such as to switch off the compressor drive motor if the seat frame has not reached its static central position in relation to the base frame, after a period of for example about five minutes.

In addition, the arrangement may preferably be such that, during the inactive operating periods of the electronic control circuit, the transistors of the compressor output stage are preferably permanently interrogated. That affords the advantage that the electronic control circuit is automatically kept permanently de-activated as soon as a transistor of the compressor output stage is found to be defective.

In another preferred embodiment of the invention, instead of the vehicle seat involving the use of an electronic control arrangement, it is also possible to provide for a mechanical control system in which the 2/2-way valve and the 3/2-way valve are adapted to be actuated by a cam disc on the belt reel device, and the belt reel device has a second cam disc for actuation of a microswitch which is connected together with the compressor drive motor. In that arrangement, as indicated above, the 2/2-way valve is only provided for blowing off gas from the gas spring while the microswitch on the other hand is only provided for switching on the compressor drive motor in order to supply pressure gas to the gas spring by means of the compressor on the seat. The 2/2-way valve therefore provides for a downward movement of the seat or more specifically the seat frame thereof, towards the base frame, while the microswitch is operative to provide for upward movement of the seat frame.

The microswitch, and also the two valves are preferably provided on a common support member which can be connected to the actuating element of the valve arrangement by means of first and second cable assemblies, while the support member can be adapted for linear displacement in a radial direction relative to the above-mentioned cam discs and pivotable about a pivot axis which is parallel to the axes of the cam discs. In that configuration the actuating element may be connected to the first and second cable assemblies in such a way that for example one cable assembly is activated by a pulling force applied to the actuating element while the other cable assembly is activated by a pressing force applied to the same actuating element, in order thereby to move the support member in such a way as to provide for actuation of either the 2/2-way valve for downward movement of the seat frame or the microswitch for raising the seat frame. The arrangement of the microswitch and the 2/2-way valve as well as the 3/2-way valve on the common support member also affords the advantage that those components form a structural unit which is simple to handle so that not only is assembly of the vehicle seat a simple operation but if necessary such a unit can also be easily and quickly replaced by a new unused structural unit.

In another preferred feature of the invention, at least one spring element is arranged to engage the support member, the spring element being subjected to a mechanical stressing upon linear displacement of the support member. A retaining or locking lever may be adapted to operate on the support member, the lever being displaceable between a retaining or locking position and a release position and maintaining the stress in the spring element in the locking position until, after the seat has reached its static central position, the locking lever is displaced into the unlocking position by means of an unlocking member provided on the belt reel device, and the 2/2-way valve and the microswitch are moved away from the associated cam discs by relief of the stress in the spring element. Consequently, the release of the spring element brings about the above-mentioned passive operating condition of the seat in which no variations in the position in respect of height of the seat are registered. Re-activation occurs only upon a subsequent adjustment in respect of height or when the actuating element is briefly actuated.

Preferably, the 3/2-way valve is arranged on the support member in such a way that the coupling means of the belt reel device is subjected to the action of the pressure gas both upon a pivotal movement of the support member about a pivot axis thereof in the clockwise direction and also in the counter-clockwise direction. That is required so that, whenever the actuating element is actuated, that is to say both when the vehicle seat is raised and also when the vehicle seat is lowered, with the coupling means of the belt reel device being subjected to the action of pressure gas, the connection between the belt reel device and the 2/2-way valve and the microswitch is interrupted. By means of a spring element it is possible for the 3/2-way valve to be returned to its normal rest position at any time, whereby the coupling means of the belt reel device is vented of gas and thus brought into a condition of mechanical connection.

Further objects, features and advantages of the invention will be apparent from the following description of preferred embodiments thereof.

BRIEF DESCRIPTION OF THE DRAWINGS

FIG. 1 is a diagrammatic side view of a vehicle seat according to the invention with belt reel device and a mechanical system for the valve arrangement.

DESCRIPTION OF PREFERRED EMBODIMENTS

Figure 6:
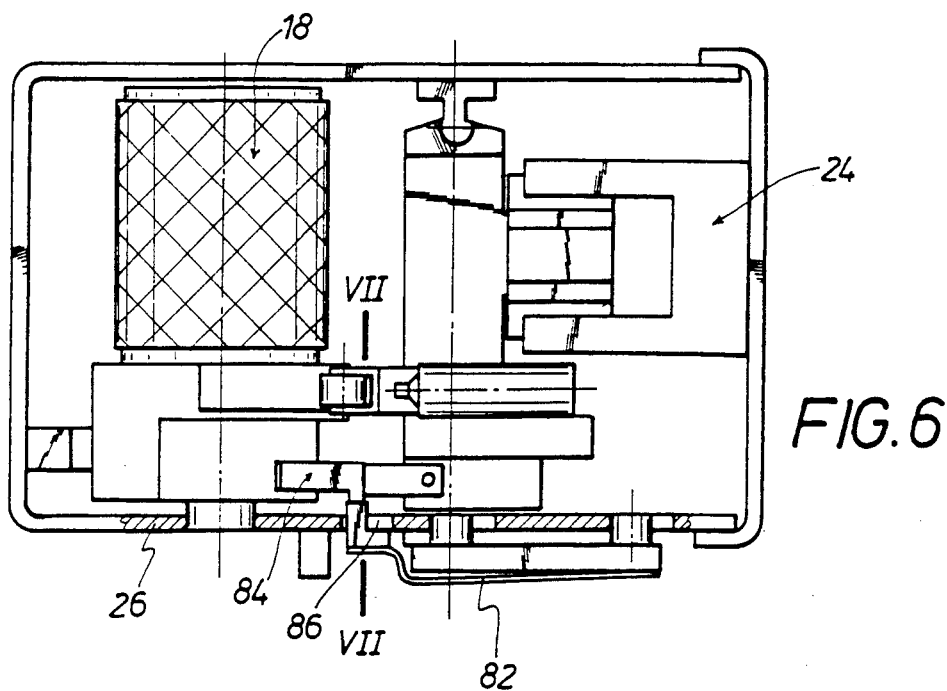
FIG. 6 is a partly sectional view of the control arrangement shown in FIGS. 1 through 5, seen from above.
Figure 7:
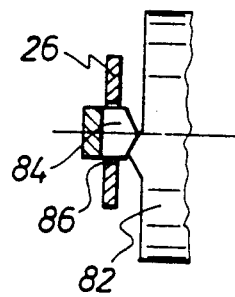
FIG. 7 is a view in section taken along line VII—VII in FIG. 6, showing the locking lever and the unlocking member.

Referring firstly to FIG. 1, shown therein in a diagrammatic side view is a seat 10 for a vehicle, in accordance with the principles of the invention, comprising a seat frame 12 and a base frame 14. The base frame 14 is adapted in use to be mounted in a vehicle in a suitable fashion. The base frame 14 and the seat frame 12 are connected together in such a way that the seat frame 12 is movable relative to the base frame 14, by means of a scissor leg support structure indicated at 16. Arranged on the seat frame 12 is a belt reel or take-up device 18 as is described in greater detail for example in above-mentioned DE 35 17 505 C2 to which reference may be suitably made for further elucidation of the configuration of the device. For present purposes however it suffices to note that the belt reel device 18 includes a clutch or coupling means and includes a belt 20 which is secured by way of one end portion thereof to the belt reel device 18 and by way of the other end portion 22 thereof to the base frame 14. Disposed in the vicinity of the belt reel device 18 is a control arrangement 24 which, on a support member 26, has a 2/2-way valve 28, a microswitch 30 and a 3/2-way valve 32, as can also be seen in greater detail from FIGS. 8, 9 and 10. The support member 26 is pivotable about a pivot axis indicated at 34 in FIG. 1, which is oriented parallel to the belt reel device 18, that is to say, parallel to the central axis 36 thereof. A cable assembly 38 of which only part is indicated in FIG. 1 is operatively connected to the support member 26 by means of a nipple 40. A second cable assembly 42 is also connected to the support member 26 by means of a nipple 40, once again only part of the second cable assembly 42 being shown in FIG. 1.

The 2/2-way valve 28 comprises a sensing or follower member 44 which is adapted to co-operate with a cam plate or disc 46 on the belt reel device 18. The belt reel device 18 also includes a second cam plate or disc 48 adapted to co-operate with a sensor or follower member 50 of the microswitch 30.

Reference numeral 52 in FIG. 1 generally denotes a gas spring which is shown in only diagrammatic form. The gas spring 52 is in fluid communication with a compressor 56 which is driven by a drive motor 54. Reference may also be made at this stage to FIG. 2 where the same components are identified by the same references as in FIG. 1. The mode of operation of the individual components of the seat 10 shown in FIG. 1 will be described in greater detail hereinafter with reference to FIGS. 2 through 12.

Figure 2:
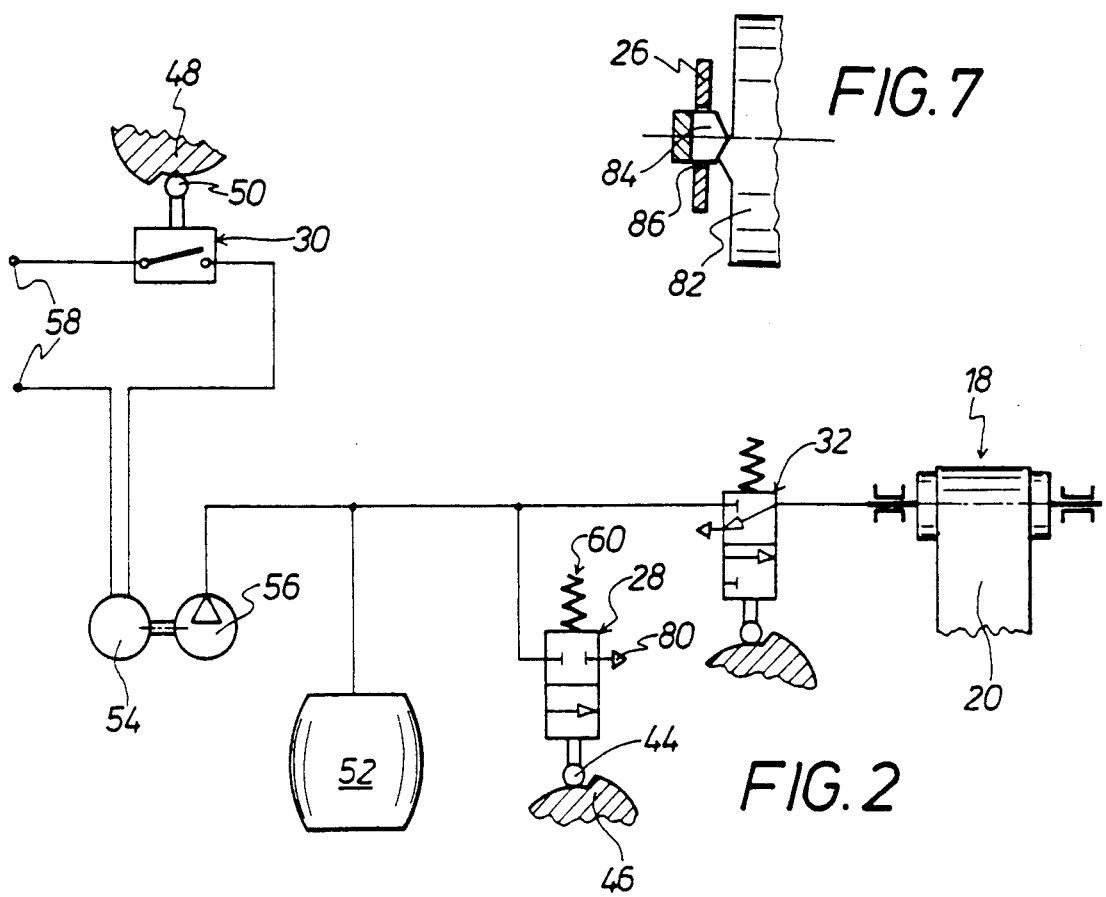
FIG. 2 shows a circuit diagram of the most important components for height and weight adjustment of the seat shown in FIG. 1.

Referring now to FIG. 2, shown therein in the form of a block diagram are the most important components of the seat structure, which are provided for adjustment of the height of the vehicle seat and for adjustment of the seat to the weight of the occupant, including the gas spring 52, the compressor 56 which is in fluid communication with the gas spring 52, the electric drive motor 54 for driving the compressor 56, the microswitch 30 with associated follower member 50 and the cam plate or disc 48 which is operatively associated with the microswitch 30 and of which only a part is shown in cross-section in FIG. 2. The microswitch 30 is connected in series with the drive motor 54 between first and second terminals 58; the terminals 58 are provided for connection to the electrical on-board system of a vehicle to which the vehicle seat is fitted.

The 2/2-way valve 28 and the 3/2-way valve 32 are in fluid communication with the compressor 56 and the gas spring 52, as can be clearly seen from FIG. 2. FIG. 2 again shows the follower member 44 of the 2/2-way valve 28, which follower member co-operates with the cam plate or disc 46 of which FIG. 2 also shows only part, in cross-section. Reference numeral 60 identifies a spring which provides for mechanical prestressing of the 2/2-way valve 28.

Reference numeral 18 in FIG. 2 again identifies the belt reel device with the belt 20 of which only part is shown in FIG. 2. As already mentioned above, the belt reel device 18 has a coupling means (not shown) which can be supplied with pressure gas from the compressor 56 way of the 3/2-way valve 32 when that valve is in the appropriate position, as will be described in greater detail hereinafter.

Figure 3:
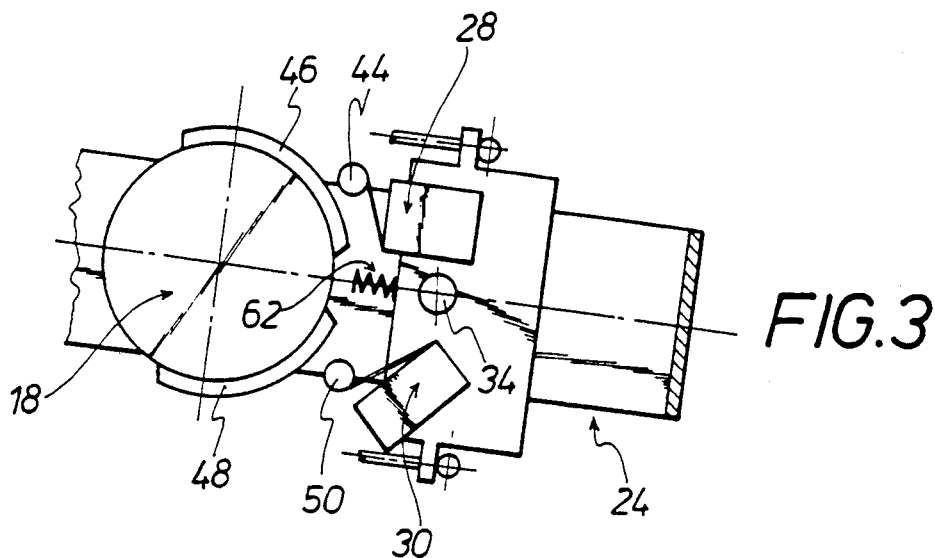
FIG. 3 shows the control arrangement of FIG. 1 in an inactive operating condition.

Referring now to FIG. 3, the control arrangement 24 and the belt reel device 18 are shown therein in a passive operating condition in which the control arrangement 24 is moved axially away from the belt reel device 18 by means of a spring element 62 so that neither the follower member 44 of the 2/2-way valve 28 nor the follower member 50 of the microswitch 30 bear against the cam disc 46 and the cam disc 48 respectively.

Figure 11:
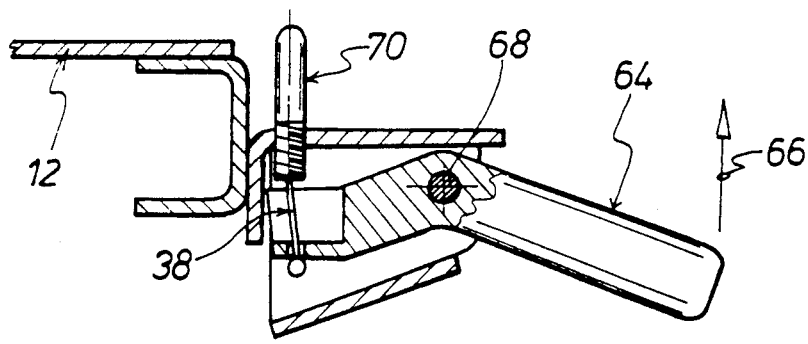
FIG. 11 is a sectional view of the actuating element when subjected to a pulling force thereon.
Figure 12:
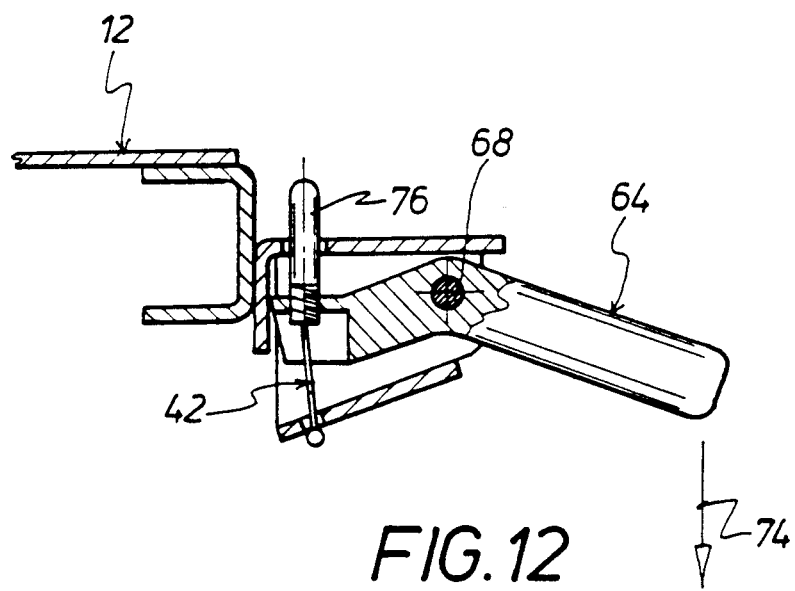
FIG. 12 is a view similar to that shown in FIG. 11 showing the actuating element when subjected to an actuating pressing force.
Figure 13:
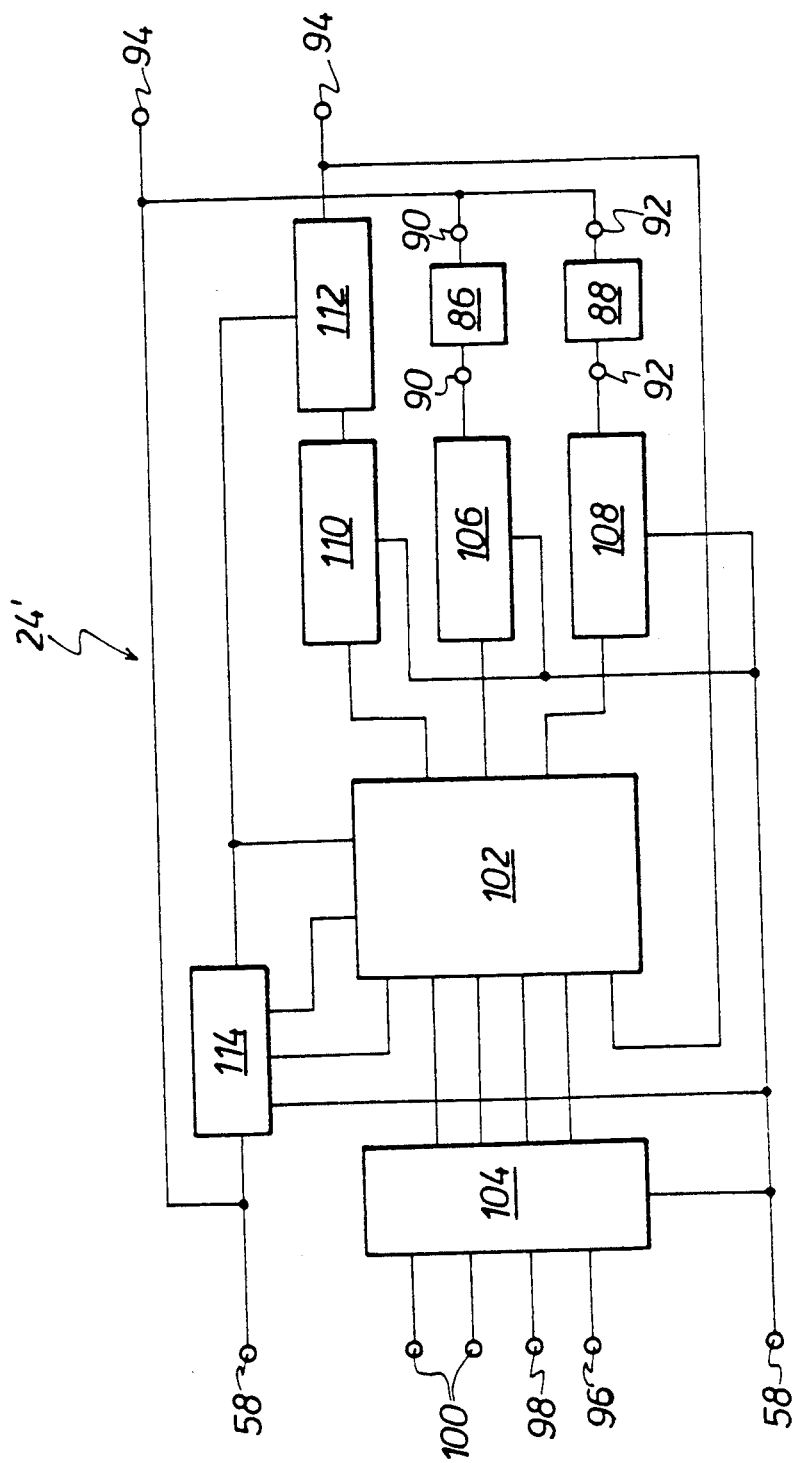
FIG. 13 is a block circuit diagram of the electronic control circuit of the vehicle seat according to the invention.

If the height of the seat 10 is to be adjusted, by the seat frame 12 being raised in relation to the base frame 14, an actuating element which is indicated at 64 in FIGS. 11 and 12 is pulled upwardly, as indicated by arrow 66 in FIG. 11. The actuating element 64 is pivotable about an axis indicated at 68 in FIG. 11 so that the cable of the cable assembly 38 is pulled downwardly in FIG. 11 out of its associated casing 70, when the actuating element 64 is pulled upwardly as indicated by the arrow 66. In that way, as can also be seen from FIG. 4, the cable assembly 38 is actuated in the direction indicated by the arrow 72 in FIG. 4, whereby the control arrangement 24 is pivoted about its pivot mounting axis 34 in such a way that the microswitch 30 is actuated, that is to say closed, by means of the cam disc 48 by way of the follower member 50. It will be seen from FIG. 2 that, when the microswitch 30 is in its closed position, power is supplied to the drive motor 54 which is thus operated to drive the compressor 56. That means however that pressure gas is supplied to the gas spring 52 from the pressure source constituted by the compressor 56, and the seat frame 12 is thus raised in relation to the base frame 14 of the seat 10, by means of the gas spring 52.

If the seat frame 12 is to be moved downwardly in relation to the base frame 14 of the seat 10, in order to reduce the seating height afforded by the seat 10, the actuating element 64 is pressed downwardly in the direction indicated by the arrow 74 in FIG. 12. When that happens, the actuating element 64 is pivoted about its axis 68 in such a way that the casing 76 of the second cable assembly 42 is pulled upwardly in FIG. 12, thereby increasing the length of the second cable assembly 42, the other end of which is connected to the control arrangement 24. That in turn involves actuation of the control arrangement 24 as indicated by the arrow 78 in FIG. 5, that is to say, the control arrangement 24 pivots about the pivot mounting axis 34 in the counterclockwise direction so that the follower member 44 of the 2/2-way valve 28 comes to bear against the cam disc 46 in order to move the 2/2-way valve 28 from the position shown in FIG. 2, into that position in which the 2/2-way valve 28 provides a fluid communication between the gas spring 52 and a vent indicated at 80 in FIG. 2 so that the pressure gas in the gas spring 52 can escape through the vent 80. That results in downward movement of the seat frame 12 in relation to the base frame 14 of the seat 10.

Figure 4:
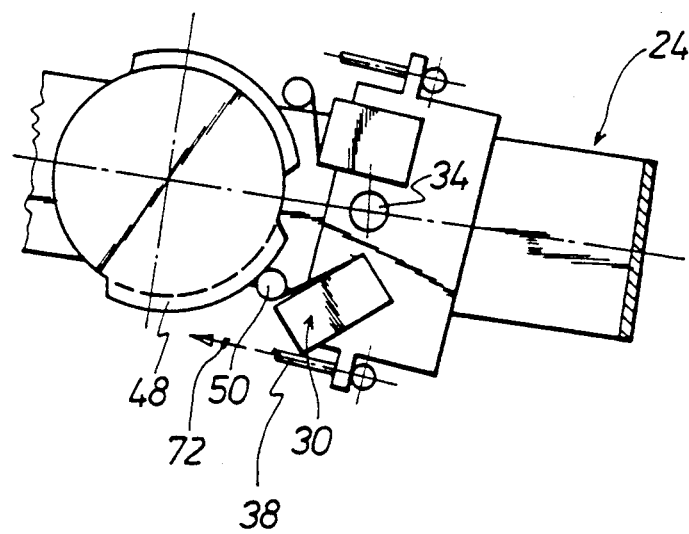
FIG. 4 is a view similar to that shown in FIG. 3 with the control arrangement in the operating condition for raising the seat frame.
Figure 5:
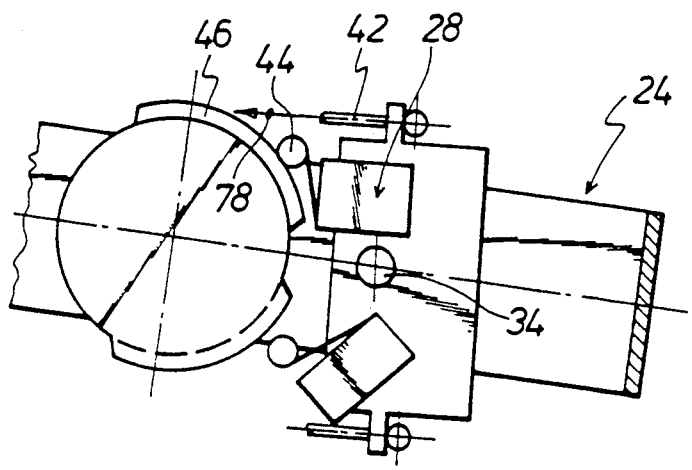
FIG. 5 is a view similar to that shown in FIGS. 3 and 4 illustrating the control arrangement in the operating condition for downward movement of the seat frame.
Figure 8:
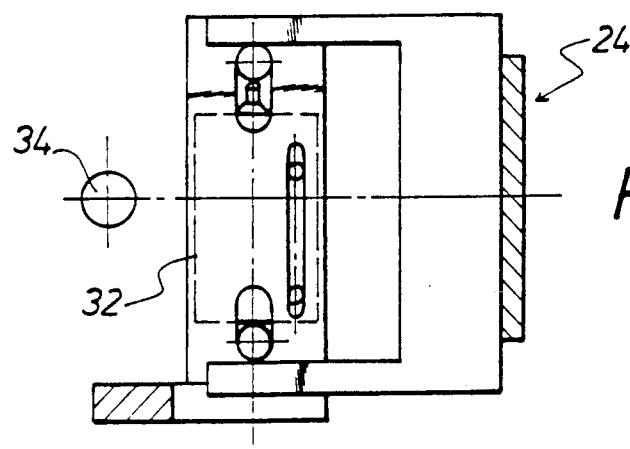
FIG. 8 shows a part of the control arrangement shown in FIGS. 1 through 6, illustrating the 3/2-way valve in the inactive operating condition.
Figure 9:
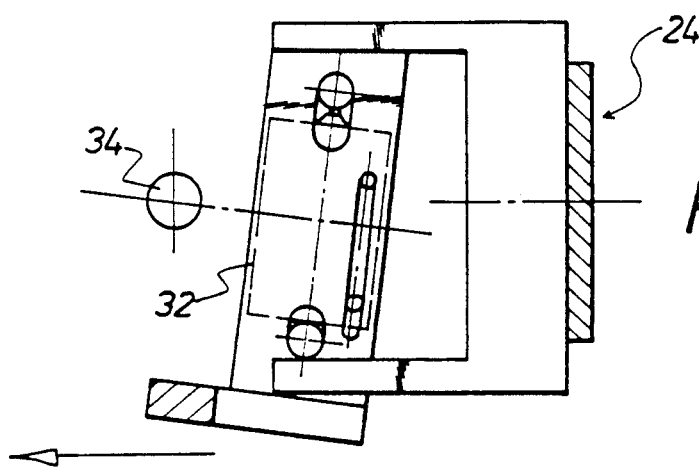
FIG. 9 is a view similar to that shown in FIG. 8 illustrating the 3/2-way valve in an active operating condition.
Figure 10:
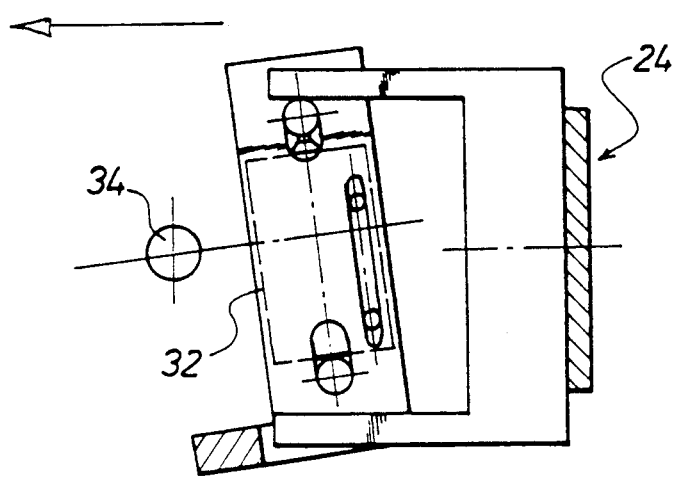
FIG. 10 is a view corresponding to that shown in FIG. 9 showing the 3/2-way valve in another or second active operating condition.

Referring now to FIGS. 8, 9 and 10, it will be seen therefrom that the 3/2-way valve 32 is actuated both upon actuation of the control arrangement 24 in the manner shown in FIG. 4, namely for raising the seat frame 12, and also upon actuation of the control arrangement 24 as shown in FIG. 5, namely for lowering the seat frame 12. In that way, as will also be clearly apparent from FIG. 2, whenever the actuating element 64 is actuated, the 3/2-way valve 22 provides a fluid communication between the compressor 56 and the belt reel device 18 or the coupling means (not shown) thereof, and at the same time the coupling means is subjected to the action of pressure gas supplied from the compressor 56.

Reference numeral 34 in FIGS. 8 through 10 again identifies the pivot mounting axis of the control arrangement 24.

FIG. 6 is a partly sectional plan view showing the control arrangement 24 together with the belt reel device 18. FIG. 6 also clearly shows a locking lever 82 and an unlocking member 84 on the belt reel device 18.

As already mentioned above, activation of the vehicle seat for adjustment thereof to the weight of the occupant is effected either by pulling on or pressing against the actuating element 64 which is pivotally mounted to the seat frame 12 by means of the mounting axis 68, as can be seen from FIGS. 11 and 12 showing a part of the seat frame 12 with the actuating element 64 associated therewith. In that mode of operation, both the microswitch 30 and the 2/2-way valve 28 are moved by means of the respective cable assemblies 38 and 42 into the adjustment position of the assembly as shown in FIG. 1 and retained in that position by means of the locking lever 82 until, after the seat frame 12 has reached a static central position in relation to the base frame 14, the locking lever 82 is released by being urged out of an opening indicated at 86 in FIGS. 6 and 7 in the support member 26, by means of the unlocking member 84 on the belt reel device 18. When the locking lever 82 is in that released position, it is possible for the spring element 62 shown in FIG. 3 to move the control arrangement 24 with the 2/2-way valve 28 and the microswitch 30 into the passive operating position shown in FIG. 3. Once that condition is attained, there is no further displacement of the seat frame 12, in other words, it remains in the static central position. If the seat frame 12 is disposed above the static central position, the 2/2-way valve 28 is actuated by means of the cam disc 46 so that pressure gas is discharged from the gas spring 52 through the vent 80 and the seat frame 12 is correspondingly lowered. If the seat frame 12 is beneath the static central position, the microswitch 30 is actuated by means of the cam disc 48 so that the drive motor 54 drives the compressor 56 which in turn supplies pressure gas to the gas spring 52.

Referring now to FIG. 3, shown therein is a block circuit diagram of an embodiment of the control arrangement, indicated generally by reference numeral 24', which, unlike the mechanical and pneumatic arrangement described above with reference to FIGS. 1 through 12, comprises electronic components which are connected together with a solenoid or electromagnetically operated valve 86 forming the 2/2-way valve, and a solenoid or electromagnetically operated valve 88 forming the 3/2-way valve. The valve 86 is connected to outputs 90 of the electronic control arrangement 24' while the valve 88 is connected to outputs 92 of the electronic control arrangement 24'. The outputs 94 serve for connection of the drive motor for the compressor disposed on the vehicle seat, to provide the pressure source for the gas spring. The electronic control arrangement 24' further has terminals 58 for the electrical on-board system of a vehicle to which the vehicle seat is to be fitted, and an input 96 for a level switch, an input 98 for a seat contact switch and inputs 100 for an up/down switch. The electronic control arrangement 24' has a microprocessor 102. Connected between the microprocessor 102 and the inputs 96, 98 and 100 is an input circuitry 104 while output stages 106 and 108 respectively are connected between the microprocessor 102 and the valves 86 and 88. A further output stage 110 is connected between the microprocessor and a monitoring circuit 112 which is connected to one of the outputs 94 for the compressor drive motor. Reference numeral 114 in FIG. 3 identifies a voltage regulating circuit.

Figure 14:
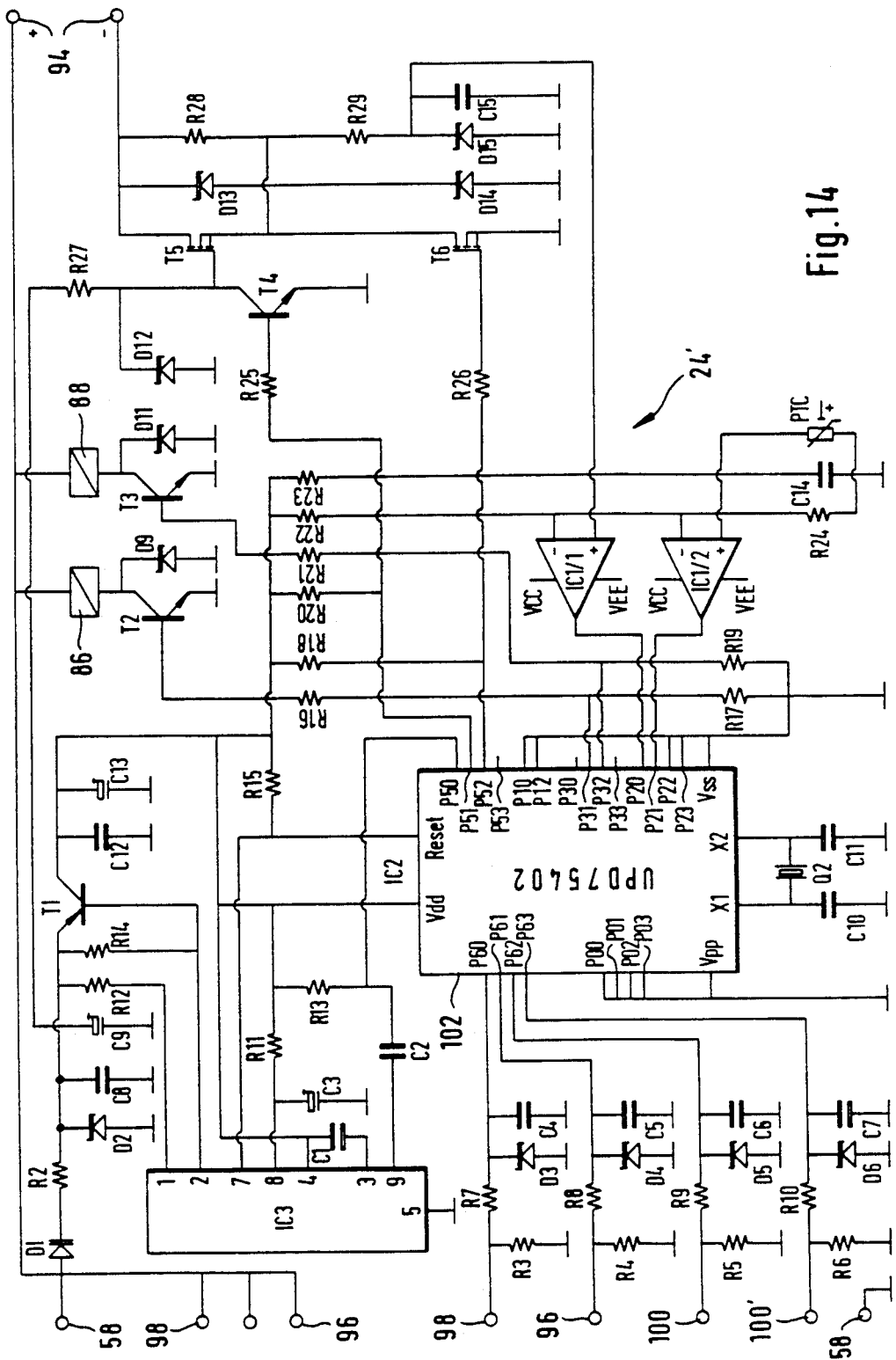
FIG. 14 is a detailed view of the block circuit shown in FIG. 13, illustrating the individual circuitry components.

Further details of the electronic control arrangement 24' will now be described with reference to FIG. 14 showing generally all the electronic components thereof and the interconnection thereof. In FIG. 14, reference numeral 102 again identifies the microprocessor, reference numeral 58 also indicates the terminals for connection to the vehicle electrical system, reference numeral 96 indicates the terminals for the level switch, reference numeral 98 indicates the inputs for the seat contact switch and reference numerals 100 and 100' respectively identify the input for the up adjustment switch and the down adjustment switch. Reference numeral 86 identifies the electromagnetic operating winding of the electromagnetic or solenoid valve providing the 2/2-way valve while reference numeral 88 identifies the winding for the solenoid valve or electrically operated valve forming the 3/2-way valve. The outputs 94 again denote the terminals for the electrical compressor drive motor.

The individual components of the circuitry shown in FIG. 14 are listed hereinafter, in accordance with their type designations and physical sizes:

| | | | |
|---|---|---|---|
| Valve 86 | 2/2-way valve | | from Staiger |
| Valve 88 | 3/2-way valve | | from Staiger |
| Microprocessor 102 | IC2 µPD75P402 | DIL28 | µ-Processor |
| | QZ 4.194 MHz | | Quartz |
| | C10 22.0 pF | SMD | Foko |
| | C11 22.0 pF | SMD | Foko |
| | R20 1.0K | SMD | Resistor 5% C |
| | R21 2.2K | SMD | Resistor 5% C |
| Input circuitry 104 | D 3 BZX84C4V7 | SOT23 | Z-Diode |
| | D4 BZX84C4V7 | SOT23 | Z-Diode |
| | D5 BZX84C4V7 | SOT 23 | Z-Diode |
| | D6 BZX84C4V7 | SOT23 | Z-Diode |
| | C4 100.0 nF | SMD | Foko |
| | C5 100.0 nF | SMD | Foko |
| | C6 100.0 nF | SMD | Foko |
| | C7 100.0 nF | SMD | Foko |
| | R3 1.0K | SMD | Resistor 5% C |
| | R4 1.0K | SMD | Resistor 5% C |
| | R5 1.0K | SMD | Resistor 5% C |
| | R6 1.0K | SMD | Resistor 5% C |
| | R7 10.0K | SMD | Resistor 5% C |
| | R8 10.0K | SMD | Resistor 5% C |
| | R9 10.0K | SMD | Resistor 5% C |
| | R10 10.0K | SMD | Resistor 5% C |
| Output stage 106 | T2 BD677 | TO126 | Darl. transist. |
| | D9 ZY29 | 0207 | Z-Diode 29 V |
| | R16 4.7K | SMD | Resistor 5% C |
| | R17 47.0K | SMD | Resistor 5% C |
| Output stage 108 | T3 BD677 | TO126 | Darl. Transist. |
| | D11 ZY29 | 0207 | Z-Diode 29 V |
| | R19 47.0K | SMD | Resistor 5% C |
| | R22 4.7K | SMD | Resistor 5% C |
| Output stage 110 | T6 RFP50N05 | T0220 | SIP-MOS transist. |
| | R27 10.0K | SMD | Resistor 5% C |
| | R18 2.2K | SMD | Resistor 5% C |
| Monitoring circuit 112 | IC1 LM 2904 | S08 | twice OP |
| | T4 BC817-40 | SOT23 | SMD transistot |
| | T5 RFP50N05 | T0220 | SIP-MOS transist. |
| | D12 BZX84C10V | SOT3 | z-Diode |
| | D13 ZY18 | 0207 | Z-Diode 18 V |
| | D14 ZY18 | 0207 | Z-Diode 18 V |
| | D15 BZX84C4V7 | SOT23 | Z-Diode |
| | NTC 23226405103 | | NTC resist. (VAL-VO) |
| | C14 100.0 nF | SMD | Foko |
| | C15 1.0 nF | SMD | Foko |
| | R23 10.0 k | SMD | Resistor 1% met |
| | R24 13.0K | SMD | Resistor 1% met |
| | R25 620.0 R | SMD | Resistor 1% met |
| | R29 2.2K | SMD | Resistor 5% C |
| | R30 75.0K | SMD | Resistor 1% met |
| | R31 15.0K | SMD | Resistor 1% met |
| Voltage regulating circuit 114 | IC3 TA7900 | SIL9 | Volt. reg. with R. dog |
| | T1 BC516 | TO92 | Darl. transist. |
| | D1 1N4007 | 0207 | Diode |
| | D2 ZY29 | 0207 | Z-Diode 29 V |
| | C1 470.0 pF | SMD | Foko |
| | C2 10.0 nF | SMD | Foko |
| | C3 10.0 µF | RM2.5 | Elko radial 25 V |
| | C8 100.0 nF | SMD | Foko |
| | C9 220.0 µF | RM 5 | Elko radial 25 V |
| | C12 100.0 nF | SMD | Foko |
| | C13 10.0 µF | RM2.5 | Elko radial 25 V |
| | R11 10.0K | SMD | Resistor 5% C |
| | R13 2.2K | SMD | Resistor 5% C |
| | R15 10.0K | SMD | Resistor 5% C |
| | R32 68.0K | SMD | Resistor 5% C |

It will be appreciated that the above-described constructions have been set forth solely by way of example and illustration of the principles of the present invention and that various modifications and alterations may be made therein without thereby departing from the spirit and scope of the present invention.

We claim:

1. A vehicle seat including a seat frame; a base frame; a gas spring operatively arranged between the seat frame and the base frame; a valve means for adjusting the pressure in the gas spring in response to the weight of the seat occupant; an actuating member for actuating the valve means; a means for adjusting a desired seat height; a belt reel means disposed between the seat frame and the base frame, said belt reel means including a coupling means, said coupling means and said gas spring adapted to be subjected to the action of a pressure gas; a pressure source for supplying said pressure gas, said pressure source including a compressor and a drive motor for the compressor, said compressor and said drive motor being located on the vehicle seat, wherein said valve means comprises:

an electromagnetically actuable 2/2-way valve, which serves only for the release of gas from the gas spring and an electromagnetically actuable 3/2-way valve located between said pressure source and the coupling means of the belt reel means; and an electronic control circuit having outputs for connection to respective ones of said valves, inputs for a seat level switch, an up/down setting switch and a seat contact switch respectively, an output for connection to the drive motor for the compressor, a microprocessor, an input circuit means between the microprocessor and said inputs of the control circuit and output stages between the microprocessor and respective ones of said valves.

2. A seat as set forth in claim 1 including a microswitch which is connected together with the drive motor for the compressor, a first cam disc on said belt reel means and operable to actuate the 2/2-way valve and the 3/2-way valve and a second cam disc on said belt reel means and operable to actuate said microswitch.

3. A seat as set forth in claim 2 including a common support member carrying the microswitch, the 2/2-way valve and the 3/2-way valve, first and second cable means connecting said support member to the actuating member, and means mounting the support member for linear displacement in a radial direction of the cam discs and pivotal movement about a pivot axis which is parallel to the axis of the cam discs.

4. A seat as set forth in claim 3 including at least one spring element engaging the support member and adapted to be mechanically stressed upon a linear displacement of the support member, a locking lever adapted to operate on the support member and displaceable between a locking position and a release position, and an unlocking member on the belt reel means, the locking lever being operable in the locking position to maintain the stress of the spring element until after the static central position of the vehicle seat is reached the locking lever is displaced into an unlocking position by means of said unlocking member and the 2/2-way valve and the microswitch are moved away from the associated cam discs by release of the stress of the spring element.

5. A seat as set forth in claim 3 wherein the 3/2-way valve is arranged on the support member in such a way that the coupling means of the belt reel means is subjected to the action of pressure gas upon a pivotal movement of the support member about said pivot axis both in the clockwise direction and also in the counterclockwise direction.

* * * * *